F. SCHOLLY.
AUTOMOBILE LOCK.
APPLICATION FILED SEPT. 14, 1916.

1,230,799.

Patented June 19, 1917.

Inventor
FRANK SCHOLLY
by H. S. Hee
Attorney

UNITED STATES PATENT OFFICE.

FRANK SCHOLLY, OF PHILADELPHIA, PENNSYLVANIA.

AUTOMOBILE-LOCK.

1,230,799.

Specification of Letters Patent.   Patented June 19, 1917.

Application filed September 14, 1916. Serial No. 120,092.

*To all whom it may concern:*

Be it known that I, FRANK SCHOLLY, a citizen of the United States, residing at Germantown, Philadelphia, in the county of Philadelphia, State of Pennsylvania, have invented a new and useful Automobile-Lock; and I do hereby declare the following to be a full, clear, and exact description of the invention, such as will enable others skilled in the art to which it appertains to make and use the same.

The present invention relates to a device for preventing theft of automobiles, and has for its object to provide a device of this character which can be readily clamped upon the tire and rim of one of the wheels and includes a wing or arm arranged to project radially beyond the wheel in such a manner that any attempt to move the automobile with the theft preventing device thereon would attract so much attention as to make theft of the machine practically impossible.

Further objects of the invention are to provide a loss preventing device for automobiles which is comparatively simple and inexpensive in its construction, which can be readily applied to a wheel or removed therefrom, which can not be detached by an unauthorized party, and which, while it will not prevent movement of the automobile, would cause the machine to have an irregular jumping motion which could not help but attract attention and would make theft of the machine practically impossible.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a fragmentary portion of an automobile, showing one of the loss preventing devices as applied to the automobile wheel.

Fig. 2 is an enlarged transverse sectional view through the device on the line 2—2 of Fig. 1.

Fig. 3 is a detail view showing a modified form of lock.

Corresponding and like parts are referred to in the following description and indicated in all the views of the drawings by the same reference characters.

For the purpose of illustration the invention is shown as applied to one of the wheels 1 of an automobile A, the attachment being in the form of a clamp which can be applied to the rim and tire of the wheel, and which includes an integral arm or wing arranged to project radially beyond the periphery of the wheel in such a manner as to produce a jumping movement of the vehicle should any attempt be made to move the vehicle with the attachment applied to any of the wheels thereof. In the present instance an outer clamping member 2 and an inner clamping member 3 coöperate with each other to grip the tire and wheel rim upon opposite sides thereof. The outer member 2 is provided with a pair of pivot ears 4, and also with an integral extension or wing 5 which is of a suitable length to project radially beyond the tire when the attachment is in operative position upon the wheel. The inner clamping member 3 is formed with an integral curved arm 6 which is adapted to extend around the thread of the tire and terminates in a sleeve 7, said sleeve fitting between the pivot ears 4 of the outer clamping member 2, and being connected thereto by means of a pivot bolt 8. The body portion of each of the clamping members 2 and 3 is formed with a face 9 to engage the felly of the wheel, and a notch 10 to receive the edge of the rim. A suitable covering 11 of leather or like material may be applied to the felly engaging faces of the clamping members to prevent marring and scratching the varnish and paint when the device is applied to the wheel. The inner end of each of the clamping members is provided with a pair of inwardly projecting spaced ears or blocks 12 which extend around the inner face of the wheel felly when the device is in operative position upon the wheel. A swinging clamping bolt 13 is pivotally connected to the ears 12 of the clamping member 3 by means of a pin 14, and arranged to be swung into a notch 15 formed in the end of the outer clamping member 2. A clamping nut 16 is threaded upon the bolt 13 so that by swinging the bolt into operative position and tightening the nut the clamping members can be forcibly drawn toward each other and clamped securely in position upon the wheel. An opening 17 in the swinging clamping bolt 13 is then brought into alinement with openings 18 in the ears 12 of the outer clamping member 2, so that the shackle of a padlock 19, or some similar locking element can be inserted through the openings to hold the clamping bolt 13 in operative position.

When the device is thus applied to the automobile wheel it can not be removed without first unlocking the padlock 19 or other locking element, and the wing 5 projects radially an appreciable distance between the tread of the tire so that if an attempt is made to move the automobile the wing will engage the surface of the road and produce a jumping movement of the wheel at each revolution thereof. This could not fail to attract attention, and would prevent the vehicle from being driven at anything greater than very low speeds. While it would not by all means prevent movement of the vehicle, yet it would operate in a very effective manner to prevent theft thereof, since it would be practically impossible for a thief to get away with a car having such an attachment on one or more of the wheels thereof. It will be observed that the wing 5 is offset laterally from one side of the door so that it will clear the outer edge of the mud guard if the wheel is revolved, thereby preventing bending and mutilation of the wheel guard should an attempt be made to move the vehicle with the attachment in position upon the wheel. When the owner wishes to use the car, the device can be quickly removed from the wheel by first unlocking the padlock 19.

A slight modification is shown by Fig. 3, in which a key operated lock 20 is mounted directly upon one of the ears 12 of the outer clamping member 2, said lock including a sliding bolt which can be moved into engagement with the opening 17 of a swinging clamping bolt 13 to hold the latter in operative position. The device is also adapted for use in connection with motorcycles, the operation being exactly the same as previously described.

Having thus described the invention, what I claim as new and desire to secure by Letters Patent, is:—

1. A device for preventing the theft of automobiles, including a pair of complemental clamping members adapted to be applied to the felly and tire of a wheel from opposite sides thereof, a laterally curved arm projecting from the outer end of one of the clamping members and pivotally connected to the opposite clamping member, a wing projecting radially from the said opposite clamping member and offset laterally from the tire of the wheel, and a swinging clamping bolt carried by the inner end of one of the clamping members and constructed for engagement with the inner end of the opposite clamping member to lock the device in position upon the wheel felly.

2. A device for preventing the theft of automobiles, including a pair of complemental clamping members adapted to be applied to the felly and tire of a wheel from opposite sides of the wheel, a laterally curved arm projecting from the outer end of one of the clamping members and adapted to extend around the tread of the tire, said curved arm being pivotally connected to the other clamping member, an integral wing projecting radially from the other clamping member and offset laterally on one side of the tire, a swinging clamping bolt carried by the inner end of one of the clamping members, the inner end of the other clamping member being slotted to receive the clamping bolt, and means for locking the clamping bolt in operative position.

In testimony whereof I have signed my name to this specification in the presence of two subscribing witnesses.

FRANK SCHOLLY.

Witnesses:
 EDWARD J. O'NEILL,
 THOS. O'BRIEN.